Oct. 11, 1949.  J. P. HAUSWALD  2,484,222
BREAD LOAF FRACTIONATING APPARATUS
Filed Nov. 5, 1947  3 Sheets-Sheet 1
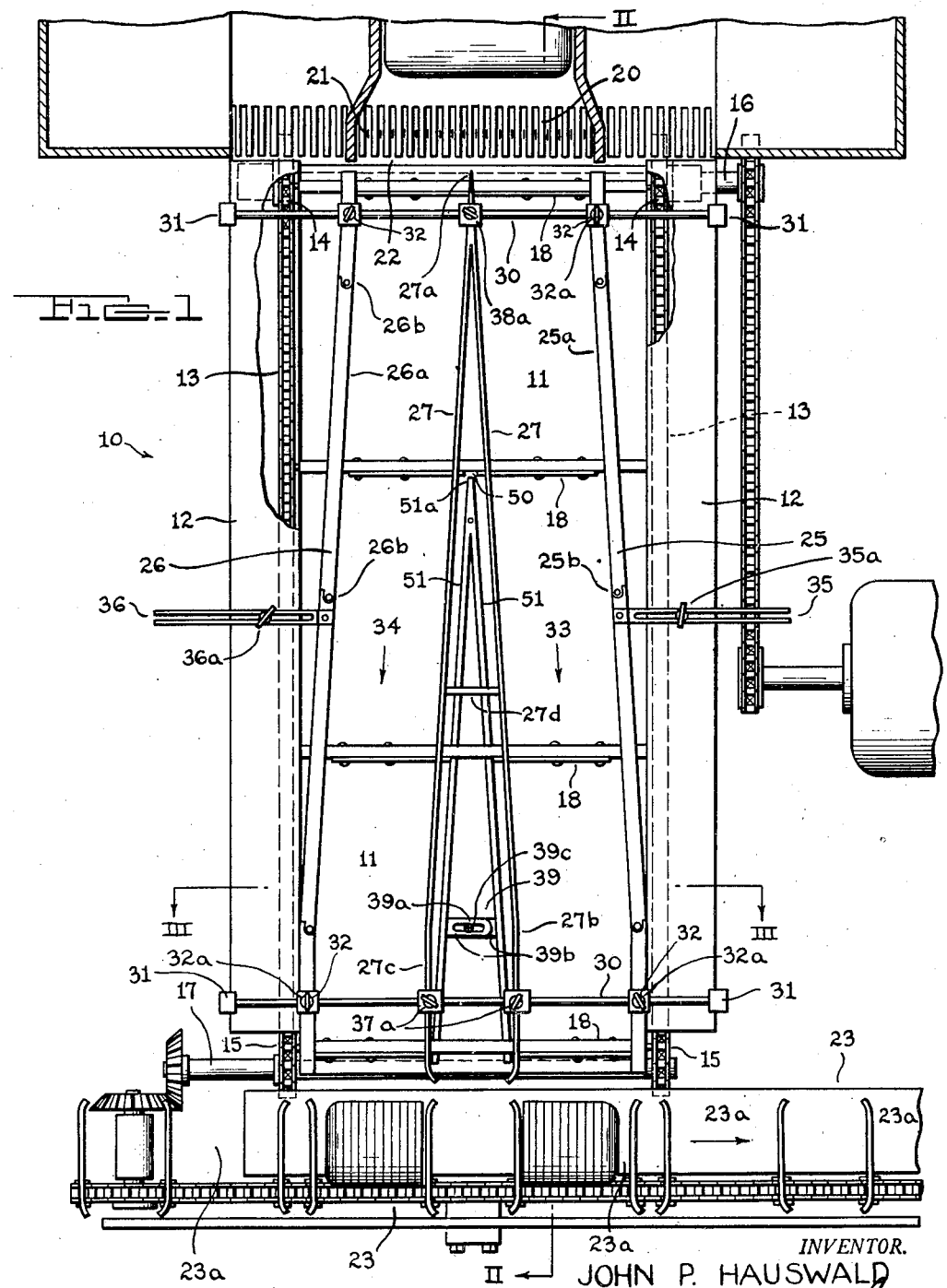
INVENTOR.
JOHN P. HAUSWALD
BY
HIS ATTORNEY Oct. 11, 1949.  J. P. HAUSWALD  2,484,222
BREAD LOAF FRACTIONATING APPARATUS
Filed Nov. 5, 1947  3 Sheets-Sheet 2
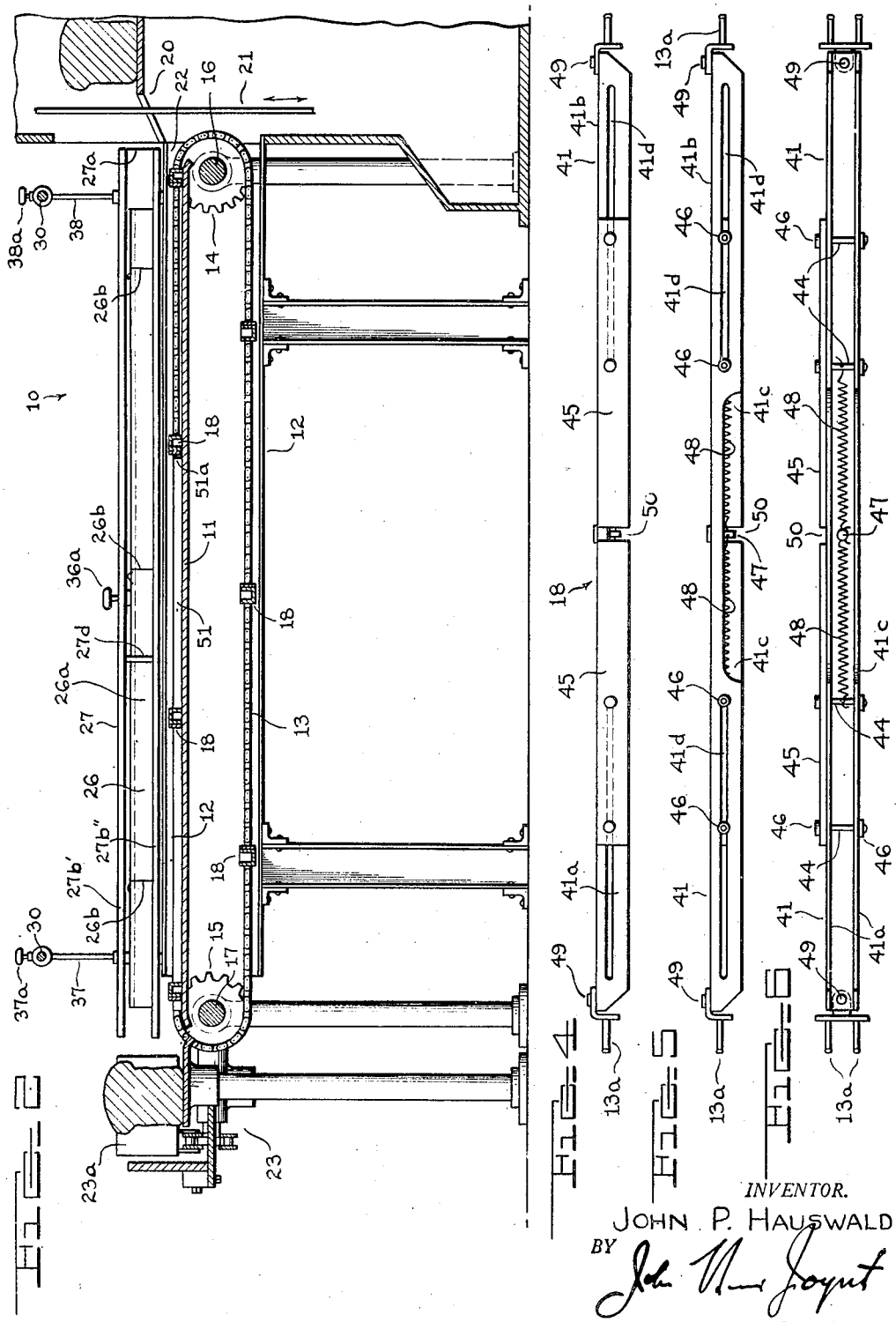
INVENTOR.
JOHN P. HAUSWALD
BY
HIS ATTORNEY

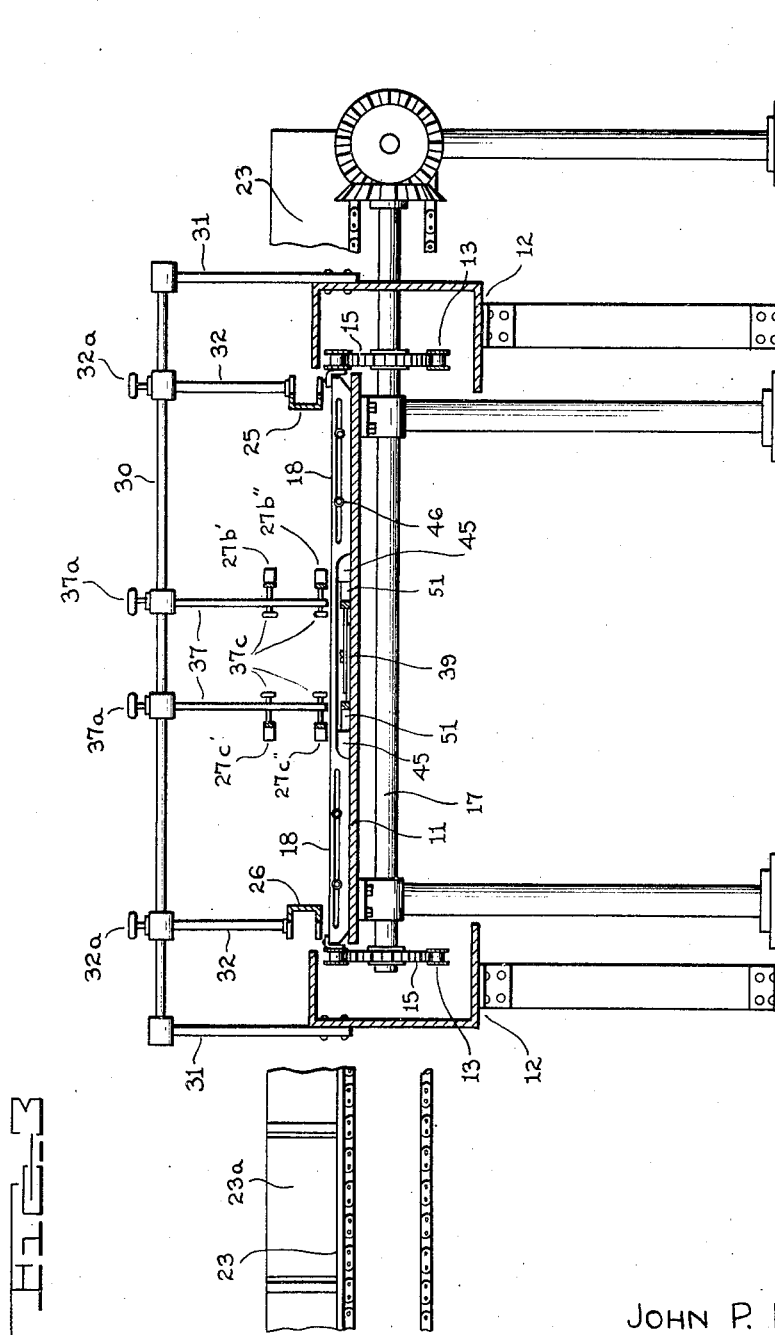

Patented Oct. 11, 1949

2,484,222

UNITED STATES PATENT OFFICE 2,484,222

BREAD LOAF FRACTIONATING APPARATUS

John P. Hauswald, Baltimore, Md.

Application November 5, 1947, Serial No. 784,238

8 Claims. (Cl. 198—30)

1

This invention relates to fractionating apparatus, and more especially to a machine for separating bread into fractions which are of appropriate size to be wrapped or packaged.

An object of my invention is the provision of simple, efficient and reliable apparatus for fractionating bread-loaves into separate and distinct portions, each portion for example comprising a plurality of slices each made to a thickness suited for table use.

A further object of my invention is the provision of a simple and thoroughly practical bread-loaf fractionating machine which positively separates the loaves with minimum detriment to the bread being handled.

A still further object of my invention is that of providing apparatus of the character indicated, which is rapid and continuous in operation for receiving the loaves and delivering the fractions.

Other objects of my invention in part will be obvious and in part pointed out hereinafter.

The invention accordingly consists in the combination of elements, features of construction, and in the several operational steps and the relation of each of the same to one or more of the others as described herein, the scope of the application of which is indicated in the following claims.

In the accompanying drawing, and illustrating an embodiment of my invention:

Figure 1 is a top plan view of a sliced loaf fractionating machine;

Figure 2 is a vertical sectional view of the machine taken approximately along the line 2—2, Figure 1;

Figure 3 is a fragmentary transverse sectional view of the machine, taken approximately along the line 3—3, Figure 1;

Figures 4 and 5 respectively represent front and rear views of one of the loaf fractionating pusher rods of the machine; and Figure 6 is an underneath view of the rod.

As conducive to a clearer understanding of certain features of my invention, it may be noted at this point that bread-loaf fractionating machines have recently come into demand for dividing bakery loaves into parts which may be separately wrapped and sold as relatively small units pointing to thrift and freshness. In practice, the entire loaves coming from a bakery oven often are subjected to slicing to useful table thicknesses; then the machine separates the loaf into two distinct halves for individual wrapping and sale. At times, the slicing operation amounts

2 to but a single cut, this being through the middle of each loaf to facilitate separation of halves which may subsequently be sliced directly by the consumer. The fractional loaves usually are individually wrapped and then are again wrapped so as to enclose the several wrapped fractions. This of course enables the consumer to open the entire unit and to use one of the individually wrapped fractional units without unsealing the other or others which accordingly remain moist and fresh.

In a somewhat different sense, bread fractionating equipment has come into widespread demand for separating loaves of bread into portions which subsequently are individually abutted to a different grade of fractionated bread for unitary wrapping. The different fractions accordingly provide a variety of breads in reasonable quantity to the consumer, and thus avoid waste.

A number of bread fractionating machines in the prior art operate in accordance with the conveyer principle. For example, a loaf of bread is taken from a slicing component of one of these machines by a fractionating conveyer which pushes the bread broadside against a pointed, fixed fractionating element. This fractionating element increases in effective width along the path of travel of the conveyer so as to promote a gradual separation of the loaf in the sense of producing a wedging action. While many of these prior art machines fundamentally have highly desirable features, the bread, in being urged past the fixed fractionating component, often crushes severely or gets caught against the pusher element and accordingly is ruined. If the bread being conveyed has already been sliced, the individual slices frequently suffer to the point of ruin by scraping, wadding or breaking off next to the pusher. The same to some extent holds true where the fractions being conveyed are in the unsliced condition.

An outstanding object of my invention accordingly is the provision of simple, durable and reliable fractionating apparatus which is well suited for positively separating and conveying bread or the like without appreciable injury to the food product.

Referring now more particularly to the practice of my invention, I provide bakery product fractionating apparatus which in the embodiment illustrated in the accompanying drawing is represented in general by the reference numeral 10. This apparatus includes a transfer conveyer table 11 which for example has a plane top surface. The conveyer table is fixed in position on a suitable frame 12 of the apparatus.

I provide a plurality of substantially parallel pusher bars 18, the corresponding ends of which are operatively connected together by substantially parallel endless chains 13 or other suitable endless components which engage sprockets 14, 15 or the like at opposite ends of the conveyer table, thus forming pusher means. In this, the sprockets 14 are fast to a main drive shaft 16 operatively journaled in the frame 12 beneath the rearward end of the conveyer table, while sprockets 15 have a supporting shaft 17 journaled in the frame beneath the outer or advanced end of the conveyer table. As arranged, the pusher bars 18 are suited for coming up at the rearward end of the transfer conveyer table and for traveling along the top of this table to advanced end thereof where they pass beneath the table until again reaching the rearward end.

The rods 18 are laterally disposed with relation to the transfer table, and individually include connector means such as a main bar portion interconnecting the chains 13, this (see Figs. 4, 5 and 6) illustratively being in the form of an inverted elongated channel 41 having two flanges 41a and an integral top 41b. At mid-length and for a substantial distance from either side of this point, the two flanges are relieved, as for example at relieved zone 41c shown in Figure 5.

There are longitudinal raceways or slots 41d in each flange 41a, one on each side of the relieved zone just referred to. The slots extend well toward the respective outer ends of the channel and are substantially coincident in directly opposite pairs, flange behind flange. The directly opposite pairs of slots accommodate paired pins 44 which bridge the flanges 41a of the inverted channel and hold slidable facing means such as the plates 45 next to the outside surface of one of the flanges. The opposite ends of the pins receive suitable washers 46 and are upset so that the plates 45 are held to the channel for retention in and guidance by the corresponding slots 41d.

Inside the inverted channel and underneath the top 41b thereof is a hook or post 47, this for receiving adjacent ends of two springs 48. The outer ends of these springs load the respective plates 45 as by hooking around pins 44. As an alternative, a single spring may be hooked to pins 44 on opposite sides of the cut-away zone 41a for loading the plates. In either event the spring means tends to draw the plates 45 toward each other and preferably to a slightly separated edge to edge relation as represented by the intermediate gap 50 in Figure 4, this being limited by pins 44 abutting the innermost ends of the slots 41d. Where force is exerted between the plates in a manner to be more fully explained hereinafter, they separate while still loaded by the spring means and thus slide under guidance of the pins toward the outer limits of the slots.

Where intended for use with link chains 13, as preferred, the channel 41 includes at the respective ends thereof, link chain portions 13a which are directly connected into the chains to form a link. The portions 13a advantageously are fastened to the channel ends by pivotal connections 49 so as to allow flexibility of movement.

Substantially symmetrical with the longitudinal center line of transfer conveyer table 11 and on the top surface (see Fig. 1) is a pusher bar separator guide for acting on the flanges 45 of these bars. This guide illustratively comprises two rails 51 which merge into a point 51a, this point being sufficiently narrow to pass between gap 50 between flanges 45. Measuring from the back of the table where the pusher bars 18 come up, the point 51a illustratively begins at a distance forward along the table surface approximately equal to the spacing between an adjacent two of these bars. On beyond the point 51a the rails 51 gradually diverge so as to provide a wedge or frog terminating at the advanced end of the table 11 with the rails spaced apart, for example by an amount substantially equal to the spacing between adjacent conveyer pockets 23a which will be more fully referred to hereinafter.

To facilitate adjustment of the pusher bar separator guide, should the feature of adjustment be desired, the point 51a illustratively is fast to the table 11 as by means of a rivet, while the rails 51 are held adjustably separate by slide joint 39 therebetween. The slide joint includes a threaded pin 39a standing in fixed upright position from the transfer table top. Two elements 39b reaching in opposite directions and having elongated slots receiving the pin 39a, are correspondingly secured, as by welding, to the rails 51. The free ends of the slotted elements are adjustably secured by a wing nut 39c or the like threaded on the pin, thus maintaining a desired spacing of the rails.

My bread-loaf fractionating apparatus preferably includes a delivery plate or grate 20 suited for guiding several loaves to the pusher bars 18, conveniently from a suitable loaf-slicing machine 21 such as a conventional high speed reciprocating slicer (not shown). The grate or guide plate 20 forms a short gap 22 with the rearward end of the transfer conveyer table for facilitating clearance and unimpeded operation by the pusher bars 18.

At the advanced end of the transfer table, I often provide a horizontal conveyer 23 for taking fractionated bread loaves away from the pusher bars 18 to a suitable wrapping machine or machines (not shown). The conveyer 23 illustratively has a plurality of pockets 23a which for example are intermittently advanced by suitable means operating in synchronization with the main drive shaft 16. These pockets accordingly move each to receive bread-loaf fractions from the pusher bars 18 and then to feed the fractions for wrapping.

Restrained to positions somewhat above the top surface of transfer table 11 and the pusher bar separator guide (see Fig. 1) are a plurality of longitudinal guides for bread, outer guides 25 and 26 and inner loaf-separating guide 27. The lowermost portions of these guides are sufficiently high to ensure underneath free passage of the pusher rods 18; the latter usually just clear the table top to engage the rails 51. The inner loaf-separating guide 27 is substantially V-shaped having a thin blade-like apex 27a at the rearward end of the table 11 and gradually increases in width, substantially to the advanced end of the table, the final width for example being about the same as the distance between adjacent conveyer pockets 23a. The apex portion 27a illustratively is closely adjacent to the mid-loaf slicing blade of the slicing machine 21 and is in a vertical position corresponding to this blade so as to guide and begin the separation of sliced half-loaves. Some distance from the apex, the loaf-separating guide 27 diverges so as to provide opposite guide portions 27b and 27c, each for urging increased separation of the half-loaves. The guide portion 27b illustratively comprises a top rail 27b' and a bottom rail 27b'' for minimum frictional effect on the bread. Similarly, the guide portion 27c comprises a top rail 27c' and a bottom rail 27c''. The top and bottom rails of each guide portion are substantially in vertical alignment. The several rails of both portions advantageously are tied together by suitable intermediate members 27d so as to produce a truss from the standpoint of over-all construction of inner loaf-separating guide 27.

Outer guides 25 and 26 illustratively are in the form of channel members, the corresponding surfaces 25a and 26a of which are substantially normal to the top surface of transfer conveying table 11 thus to achieve the bread-guiding function. The outer guides begin at points on opposite sides of the apex or narrow portion 27a of the inner loaf-separating guide and are individually spaced at a distance from the latter which space for example is slightly more than half the width of the bread-loaf. Approximately this same spacing between the effective guiding surfaces of the several bread guides prevails along the length of the transfer table. The outer guides surfaces 25a and 26a accordingly form paths 33 and 34 for bread, each approximately one-half loaf wide, respectively with the portions 27b and 27c of the V-shaped inner loaf-separating guide. Then paths diverge one from the other in accordance with the width of the inner loaf-separating guide and extend from rearward end at apex 27a to forward end of the transfer table.

The relative positions of the guides 25, 26 and 27 and their bottom clearance above the top of transfer table 11 are maintained by supports (see Fig. 3). For this purpose a pair of cross-rods 30, one laterally across end of the transfer table, are held sufficiently high to clear the fractionated loaves on the table surface by uprights 31 fixed to the frame 12. Adjustable along each cross-bar are two arms 32 hanging down and individually supporting a corresponding one of the outer guides 25 and 26 so that the bottoms of these guides clear the pusher bars 18. The arms 32 include threaded set-screws 32a for engaging the corresponding cross-rod 30 and maintaining a selected width of the several bread paths after desired adjustment of the arms and the outer guides. Usually, the outer guides comprise a plurality of sections for increasing the facility of lateral adjustment, these sections being hinged together by suitable hinges 25b and 26b. On the frame 12, and for adding support and ease of adjustment, are lateral slide members 35 and 36 connected to intermediate points along the lengths of the outer guides 25 and 26, such as near to one of the hinges 25b and 26b, respectively. The slide members are available for adjustment by sliding to desired position of the outer guides and by clamping to the frame 12 by the use of set-screws 35a and 36a.

A lateral adjustment of the V-shaped inner loaf-separating guide 27 (see Fig. 1) conveniently is achieved by means of arms 37 having set-screws 37a along the advanced cross-rod 30, and by arm 38 having set-screw 38a along the rearward cross-rod 30. Collectively, these arms hold the inner loaf-separating guide a suitable distance above pusher bars 18, and enable lateral adjustment and clamping by the set-screws. The arms 37 reach between the guide portions 27b and 27c, near the advanced end of the transfer table. A further adjustment of the inner guide, for varying the separation of the guide portions 27b and 27c is facilitated by bolts 37b which lead laterally from the rails 27b', 27b'', 27c' and 27c'' through openings in the adjacent arms 37 and include wing nuts 37c.

As illustrative of the practice of my invention, sliced bread is delivered to the rearward end of the transfer table 11 for example from the loaf-slicing machine 21. The bread is guided in any suitable manner onto the table, to between the outer bread guides 25 and 26, and separation of the loaf into sliced half-loaves is begun by the blade-like apex 27a of the inner loaf-separating guide. During this time, and with main drive shaft 16 rotating in proper direction, under power from a suitable source, chains 13 advance in a continuous path over their sprockets 14 and 15 thus bringing up pusher bars 18 at the rearward end of the conveyer table 11. One of the bars 18 comes up behind the introduced loaf of bread, thus urging the bread forward along the apex 27a. As the bread advances, the distance of separation between the fractionated loaf increases as prompted by the wedging action of opposite guide portions 27b and 27c of the inner loaf-separating guide. When this wedging action first begins, or shortly thereafter, the pusher bar 18, while advancing under the bread-loaf separator guide 27, and with pusher plates 45 immediately behind the loaf of bread, strikes point 51a of the pusher bar separator guide. The point 51a enters gap 50 between the pusher plates 45. Cutaway zone 41c of channel 41 clears the rails 51 and is of sufficient width to permit clearance along the entire length of the table. As the bar 18 continues to advance, the rails 51 cause the pusher plates 45 to slide laterally across the transfer table and relative to channel 41, this sliding movement further being guided by pins 44 and slots 41d, and also resisted by springs 48. In moving laterally the pusher plates substantially follow the lateral movement of the fractionated loaf as prompted by the inner loaf-separator guide 27. The loaf fractions accordingly suffer substantially no relative movement with respect to the pusher plates 45 and substantially no dragging or scraping against the plates. The fractionating action continues until the bread fractions reach an appropriate distance of separation and then are pushed off by the bar 18 such as into corresponding pockets 23a of the wrapping machine conveyer 23. Upon passing beyond the rails 51 at the advanced end of the transfer conveying table, the pusher plates 45 of the bar 18 return under the action of springs 48 to the position of forming a close gap 50. As the chains 13 continue to move, the bar returns beneath the transfer table to the rearward end, there to come up behind another sliced loaf of bread. The other bars 18 connecting the chains 13 operate in a fashion similar to the single bar described. The various bars illustratively are synchronized with the slicing machine 21 and each pushes a sliced loaf through the fractionating stage and delivers the fractions to corresponding pockets 23a. Conveyer 23, for example is synchronized with the pusher bars 18 and advances two empty pockets 23a to the fractionated-loaf take-off position. The fractions then are wrapped in any suitable manner, as after advancement to a wrapping machine by the conveyer 23.

Thus it will be seen that in the invention there is provided bread fractionating apparatus wherein the various objects hereinbefore set forth together with many thoroughly practical advantages are successfully achieved. It will also be seen that the fractionating apparatus often includes or is made to operate in conjunction with bread slicing and wrapping machinery in the rapid production of sliced, wrapped fractionated bread.

While much emphasis has been placed upon the handling of fractions which individually comprise plurality of slices, it will be understood that my fractionating apparatus also is well suited for separating unsliced halves severed by a single cut from a whole loaf of bread.

It will also be understood that sometimes I provide the pusher bar separator guide in an elevated position above the conveyer table surface and as a lowermost portion of the V-shaped inner loaf-separating guide, instead of directly on the table as hereinbefore described. In this practice, I connect the pusher bars between the driving chains so that the intermediate gaps between the corresponding pusher plates are turned up for overhead separation of these plates by the elevated pusher bar separator guide.

As many possible embodiments may be made of my invention, and as many possible changes may be made in the embodiments hereinbefore set forth, it will be understood that all matter described herein is to be interpreted as illustrative and not as a limitation.

I claim:

1. Bread-loaf fractionating apparatus, including table means adapted for supporting a plurality of bread-loaves for sliding movement, bread-loaf separator guide means adjacent to the top of said table means and forming diverging paths with the same for separate fractions of bread, and bread pusher means suited for movement along said table means and having relatively movable bread pusher face elements for separation one from another substantially to the diverging course of the bread along the lengths of said paths.

2. Bread-loaf fractionating apparatus, including table means adapted for supporting a plurality of bread loaves for sliding movement, bread-loaf separator guide means comprising a substantially V-shaped inner loaf-separating guide and outer guides forming diverging paths for separate fractions of bread with the table means, and bread pusher means suited for movement along said table means and having relatively movable bread pusher-face elements for separation one from another substantially to the diverging course of the bread along the lengths of the paths.

3. Bread-loaf fractionating apparatus, including table means adapted for supporting a plurality of bread loaves for sliding movement, bread-loaf separator guide means supported substantially above the top of said table means and forming diverging paths with the same for separate fractions of bread, bread pusher means suited for movement along the top of said table means and beneath said bread-loaf separator guide means and having relatively movable bread-loaf pusher face elements suited for relative movement, and guide means for separating said pusher face elements by an amount substantially consistent with the diverging course of the bread fractions.

4. Bread-loaf fractionating apparatus, including table means adapted for supporting a plurality of bread loaves for sliding movement; bread-loaf separator guide means supported substantially above the top of said table means and comprising a V-shaped inner loaf separating guide and outer guides forming diverging paths for separate fractions of bread with the table means; bread pusher means comprising an endless carriage supporting a plurality of pusher bars for movement between the top of said table means and the bread-loaf separator guide means, each said bar comprising relatively movable bread-loaf pusher face elements suited for relative movement; and guide means for separating said pusher face elements by an amount substantially consistent with the diverging course of the bread fractions.

5. Bread-loaf fractionating apparatus, including table means adapted for supporting a plurality of bread loaves for sliding movement; bread-loaf separator guide means supported substantially above the top of said table means and forming diverging paths with the same for separate fractions of bread; bread pusher means comprising an endless carriage supporting a plurality of spaced pusher bars for movement between the top of said table means and the bread-loaf separator guide means, each said bar comprising relatively movable bread-loaf pusher face elements spaced apart along the length thereof; and pusher bar separator-guide means longitudinally between said diverging paths, for separating said pusher face elements to the diverging course of the bread.

6. A bread-loaf pusher bar comprising a main bar portion, two bread-loaf pusher face elements slidably mounted along said main bar portion and having adjacent edges slightly separated from each other, and spring means loading said bread-loaf pusher face elements toward minimum separation of the adjacent edges and against sliding to further separation.

7. A bread-loaf pusher bar comprising a main bar portion, two bread-loaf pusher face elements slidably mounted along said main bar portion and having adjacent edges slightly separated from each other, spring means loading said bread-loaf pusher face elements toward minimum separation of the adjacent edges and against sliding to further separation, and link chain components mounted on opposite ends of said main bar portion.

8. A bread-loaf pusher bar comprising a channel-shaped component having opposite flanges with intermediate relieved portions at the respective edges thereof and longitudinal elongated slots on both sides of the relieved portions, two bread-loaf pusher face elements, each having at least two pins extending through the corresponding slots of both flanges for sliding along the same and separating the adjacent edges at the opening of the relieved portion, and spring means loading the pins on opposite sides of the relieved portions of said flanges toward each other and against sliding separation of the adjacent edges of the plates.

JOHN P. HAUSWALD.

No references cited.